C. ORDWAY.
METHOD OF RECOVERING CRYSTALLINE SUBSTANCES FROM LIQUOR AND DRYING THE SAME.
APPLICATION FILED OCT. 8, 1907.
905,568.  Patented Dec. 1, 1908.
2 SHEETS—SHEET 1.
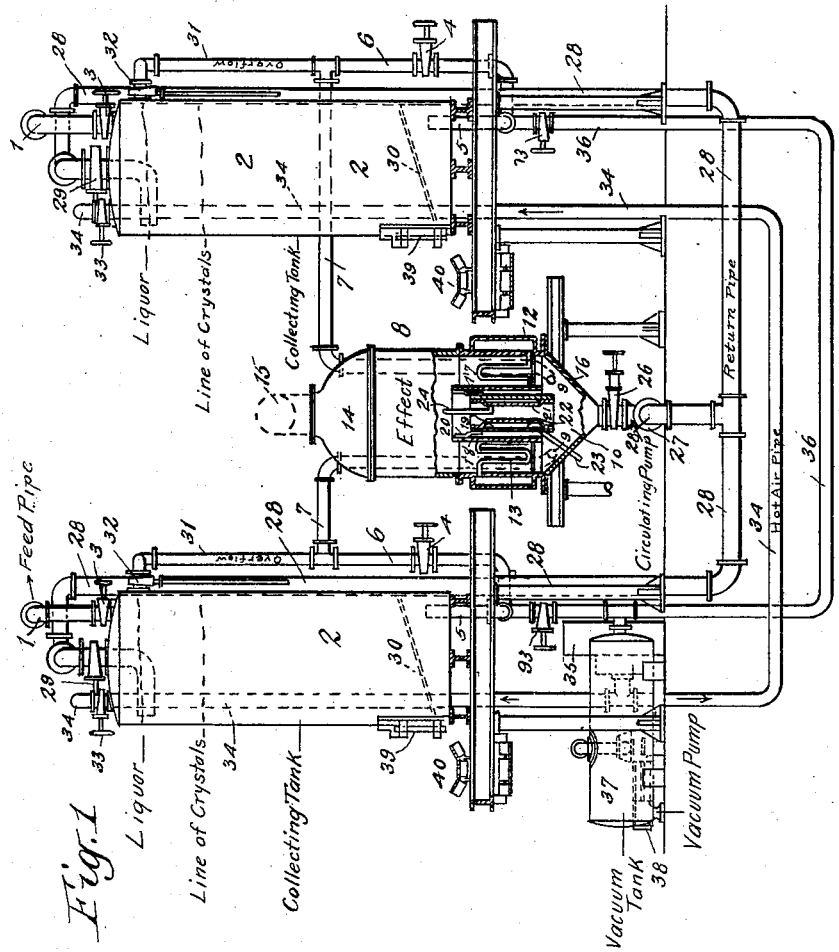
WITNESSES
INVENTOR
Charles Ordway
BY
ATTORNEYS C. ORDWAY.
METHOD OF RECOVERING CRYSTALLINE SUBSTANCES FROM LIQUOR AND DRYING THE SAME.
APPLICATION FILED OCT. 8, 1907.
905,568.
Patented Dec. 1, 1908.
2 SHEETS—SHEET 2.
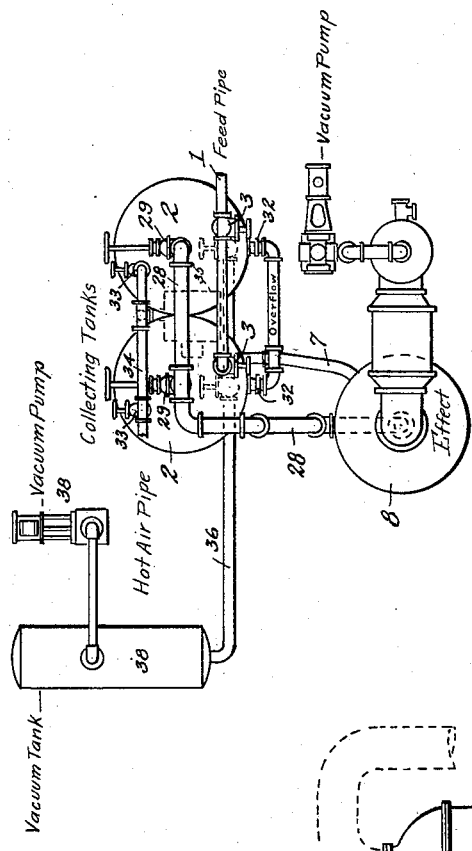
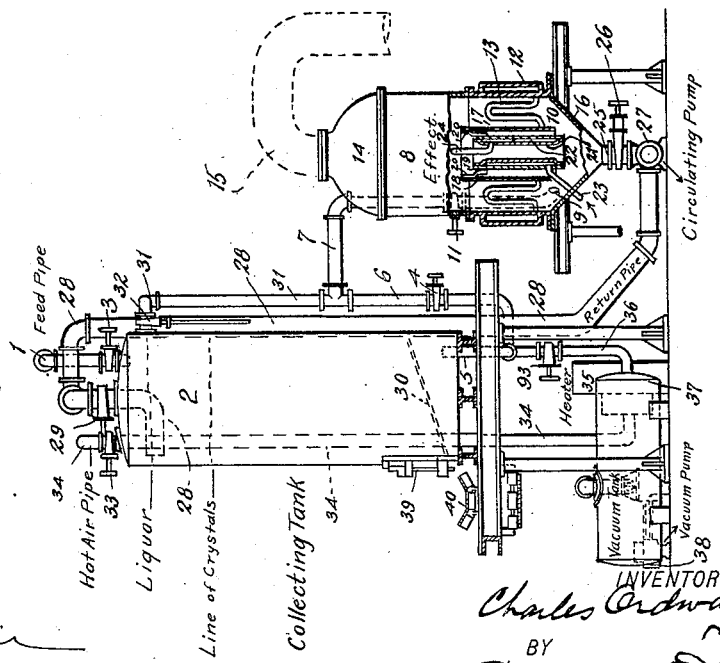

UNITED STATES PATENT OFFICE.

CHARLES ORDWAY, OF NEW YORK, N. Y.

METHOD OF RECOVERING CRYSTALLINE SUBSTANCES FROM LIQUOR AND DRYING THE SAME.

No. 905,568.   Specification of Letters Patent.   Patented Dec. 1, 1908.

Application filed October 8, 1907. Serial No. 396,425.

*To all whom it may concern:*

Be it known that I, CHARLES ORDWAY, a citizen of the United States, residing at New York, in the county and State of New York, have made a certain new and useful Improvement in Methods of Recovering Crystalline Substances from Liquor and Drying the Same, of which the following is a specification, reference being had to the drawing, which shows one form of apparatus by which my invention may be practiced.

This invention relates to manufacture of crystalline material, such as salt, sugar or other analogous substances and freeing the crystalline material from the liquor.

For the purpose of convenience in description the method of recovering salt from its brine will be described in connection with the manufacture of salt, but it is to be understood that my method is not limited to the recovery of this crystalline material.

In carrying out this invention the salt brine may for example be continuously heated and evaporated in an effect and circulated through the effect and an adjacent collecting tank in which the crystals may be separated from the liquor and collected on a suitable screen or otherwise before the liquor returns to the effect for further treatment. When a sufficient amount of crystals have collected in the collecting tank the admission of the heated liquor thereto is stopped and the heated liquor from the effect is similarly passed through another collecting tank. The remaining liquor in the first collecting tank charged with crystals is then withdrawn and heated air or similar hot gaseous drying medium is passed through the mass of crystals in the collecting tank so that the crystals are thoroughly dried before their removal from the tank.

In the accompanying drawings showing one means for practicing my invention and in which the same reference numeral refers to similar parts in the several figures, Figure 1 is a side elevation, parts being in section of an effect used in connection with two settling tanks and other apparatus whereby my method can be carried out. Fig. 2 is a plan view of the apparatus shown in Fig. 1. Fig. 3 is a side elevation, parts being shown in section for the purpose of illustration of an effect with a single collecting tank. Fig. 4 is a detail view of the heater.

In the illustrative embodiments of the apparatus shown in the drawings, 1 is a feed pipe through which brine or any other suitable liquor is fed into the collecting tank 2, the flow being regulated by the feed valve 3.

In practice, when it is desired to start the apparatus I fill the tank 2 full of the brine or other analogous liquor first closing the vacuum valve 93 and vacuum break 33 and opening valve 32 so that the liquor will flow through the pipes 31 and 7 into the effect 8, the mouth 9 of the pipe 7 opening into the lower portion of the liquor chamber 10 of the effect, the flow through the pipe 7 being controlled by the valve 11. When the liquor in the effect 8 has reached the proper level, I close the feed valve 3 permitting the liquor in the liquor chamber 10 of the effect 8 to be evaporated by any suitable heating medium passing through the jacket 12 and coils 13 in the well known manner. This vapor rises and passes into the vapor chamber 14 of the effect 8 and is drawn off through the vapor pipe 15 where it may be condensed, or if a battery of effects are used I may cause the hot vapor to heat the liquor in the next effect by connecting the same with the steam jacket 12 of another effect (not shown) the jacket 12 being similar to that shown in Fig. 3 of the drawing.

The continued boiling of the liquor in the liquor chamber 10 concentrates it, causing the heavier liquor, particularly that charged with crystals, to sink into the inclined bottom 16 of the liquor chamber 10, this action being accelerated by a jacketed downtake 17 which is mounted in about the center of the liquor chamber 10. This downtake consists of a cylindrical body 18 within which is hung a second cylindrical body 19, the upper portion of the body 19 being suspended some little distance below the top of the cylindrical body 17 by means of the brackets 20, 20, as clearly shown in Figs. 1 and 3. This inner cylindrical body 19 has a lining 21 spaced from it leaving an annular closed chamber 22 through which cold water or any other cooling medium, such as air or cold liquor, may be passed by means of the inlet pipe 23 and outlet pipe 24. The concentrated liquor and crystals pass, as noted, through the inclined portion 16 of the liquor chamber 10 and are drawn off through a pipe 25 controlled by a valve 26 and are forced by a circulating pump 27 through the return pipe 28 back into the upper portion of the collecting tank 2, the pipe 28 having a controlling valve, such as 29. In this collecting tank the crystals fall to the bottom and are collected on an inclined screen 30, the mother liquor overflowing from the collecting tank through the overflow pipe 31, suitably controlled by a valve 32, back into the effect 8 through the pipe 7. As required the valve 3 is regulated to admit a sufficient quantity of liquor into the collecting tank 2 to compensate for the evaporation which takes place in the effect 8. This liquor will, of course, also flow through the pipes 31 and 7 to the effect 8 until such time as sufficient crystals have collected upon the screen 30 in the collecting tank 2, requiring the emptying of that tank.

Where merely one collecting tank is used with one effect, as for instance, shown in Fig. 3, it will be necessary to shut down the effect until such time as the tank 2 has been emptied of its collected crystals and again filled with the liquor when the action is repeated. The most economical way, however, is to use two or more settling tanks with one effect so that while one is being emptied of collected crystals the effect may be used with one or more of the other collecting tanks and vice versa. It is, of course, also to be understood that a series or battery of effects may be used, in which case I prefer to use two or more collecting tanks for each effect.

After the crystals have collected in the collecting tank in sufficient quantities to require their removal, I close the valves 3, 29 and 32 and open the valve 4 in the pipe 6. I then break the vacuum in the closed tank 2 by means of the vacuum break or valve 33, the atmospheric pressure being sufficient to force what remaining liquor there is upon the top of the crystals back into the effect 8 through the pipes 5, 6 and 7, the vacuum valve 93 being at this time closed. As soon as substantially all the remaining liquor has been driven off of the crystals by causing it to pass through these pipes 5, 6 and 7 back to the effect 8, I close the valve 4 and open the vacuum valve 93 in the vacuum pipe 36 which connects with a vacuum tank 37, the vacuum being made by the vacuum pump 38.

To avoid the time, expense and delay of drying the crystals in an oven or kiln after they have been removed from the collecting tank 2, I arrange my vacuum break 33 to control preferably a hot air pipe 34 connected with a heater 35 of any approved pattern wherein the air is heated in any suitable manner, such as causing it to pass through or over steam coils or in any other manner and thence draw the heated air through the hot pipe 34 and through the valve 33 passing it into preferably the top of the collecting tank 2. Hot air may be continuously drawn through the crystals passing from the heater 35 through the pipe 34, collecting tank 2, pipe 5, and vacuum pipe 36 until such time as the crystals have been dried when the valve 93 is closed and the door 39 of the tank opened, permitting the crystals to fall upon a conveyer 40 of any approved construction whence they are carried to the storage bin.

While I have described my method in connection with a heater and a hot air pipe, as I preferably use the same to expedite the drying of the crystals, it is not, of course, to be understood that my invention is limited to drying the crystals by air nor is it to be limited in any manner by the use of hot air as any drying medium may be used which would not injure the crystals, as, for instance, in the case of the manufacture of salt or sugar, steam might be used, or I may use air or any other gas which has or has not been heated and which would not injure the crystals. Or I may dry the crystals while in the collecting tank by heating the tank externally in any suitable manner.

To again put the collecting tank 2 into cooperation with the effect 8, it is merely necessary to seal the door 39, close the valve 33 and open the valves 3, 29 and 32 until the required amount of liquor is in the collecting tank and the effect when the operation is repeated. The operation with two or more settling tanks, as shown in Fig. 1, is the same as in Fig. 3, it being merely necessary to operate the valves so that when one collecting tank is thrown out of operation to remove the crystals the other collecting tanks, by the manipulation of the proper valves, are thrown into operation so that the method may be continuous.

Having thus described this invention in connection with one form of apparatus, it is to be distinctly understood that it is not limited in use to such apparatus, for

What is claimed as new and what is desired to be secured by Letters Patent is set forth in the appended claims.

1. The process of evaporating salt brine and recovering and drying the crystals therefrom consisting in continuously evaporating brine in an effect, in passing the heated brine and contained crystals from said effect through a collecting tank and in collecting the crystals in said collecting tank until it is sufficiently charged therewith, in thereupon stopping the admission of brine to said collecting tank and withdrawing the liquor therefrom, in heating a gaseous drying medium and in sucking the same through the mass of crystals in said collecting tank to dry the same therein before removal therefrom.

2. The process of evaporating liquor and recovering and drying crystals therefrom consisting in continuously evaporating the liquor in an effect, in passing the heated liquor and contained crystals from said effect through a collecting tank and in collecting the crystals in said collecting tank until it is sufficiently charged therewith, in thereupon stopping the admission of said heated liquor to said collecting tank and in passing the heated liquor and contained crystals from said effect through another collecting device, in withdrawing the liquor from said collecting tank and in passing a hot gaseous drying medium through the mass of crystals in said collecting tank to dry the same therein before removal therefrom.

3. The process of evaporating liquor and recovering and drying crystals therefrom consisting in continuously evaporating liquor in an effect, in passing the heated liquor and contained crystals from said effect through a collecting tank and in collecting the crystals in said collecting tank until it is sufficiently charged therewith, in stopping the admission of liquor to said collecting tank and withdrawing the liquor therefrom, in heating a gaseous drying medium and in passing said heated gaseous medium through the mass of crystals in said collecting tank to dry the same therein before removal therefrom.

4. The process of evaporating liquor and recovering and drying crystals therefrom consisting in evaporating the liquor, in passing the liquor and contained crystals through a collecting tank and in collecting the crystals in said collecting tank until it is sufficiently charged therewith, in withdrawing the liquor from said collecting tank and in passing a hot gaseous drying medium by suction through the mass of crystals in said collecting tank to dry the same therein before removal therefrom.

5. The process of evaporating liquor and recovering and drying crystals therefrom consisting in evaporating the liquor and collecting the crystals therefrom in a collecting tank, in withdrawing the liquor therefrom and in passing a fluid drying medium over or through the mass of crystals in said collecting tank to dry the same therein before removal therefrom.

6. The process of evaporating liquor and recovering and drying crystals therefrom consisting in evaporating the liquor, in passing the liquor and contained crystals into a collecting tank and in collecting the crystals in said collecting tank, in withdrawing the liquor therefrom and in passing a hot fluid drying medium over or through the mass of crystals in said collecting tank to dry the same therein.

CHARLES ORDWAY.

Witnesses:
  JESSIE B. KAY,
  ALAN M. JOHNSON.